United States Patent [19]

Getman et al.

[11] Patent Number: 5,755,136
[45] Date of Patent: May 26, 1998

[54] DEVICE FOR MONITORING A PREDETERMINED LEVEL OF A LIQUID IN A CONTAINER

[75] Inventors: Igor Getman; Sergej Lopatin, both of Lörrach; Roland Müller, Steinen, all of Germany

[73] Assignee: Endress + Hauser GmbH + Co., Maulburg, Germany

[21] Appl. No.: 732,196

[22] Filed: Oct. 16, 1996

[30] Foreign Application Priority Data

Oct. 17, 1995 [DE] Germany ............ 195 38 680.9

[51] Int. Cl.[6] ............................................. G08B 21/00
[52] U.S. Cl. ................... 73/290 V; 340/618; 367/163; 367/165; 367/908
[58] Field of Search .......................... 73/290 V, 866.5; 340/618, 621; 367/157, 159, 162, 163, 165, 908; 181/124

[56] References Cited

U.S. PATENT DOCUMENTS

| | | | |
|---|---|---|---|
| 3,277,435 | 10/1966 | Thompson et al. | 367/157 |
| 3,890,423 | 6/1975 | Zacharias, Jr. | 367/165 |
| 4,004,266 | 1/1977 | Cook et al. | 367/165 |
| 4,144,517 | 3/1979 | Baumoel. | |
| 4,280,126 | 7/1981 | White | 340/621 |
| 4,326,274 | 4/1982 | Hotta et al. | 367/162 |
| 4,735,097 | 4/1988 | Lynnworth | 73/290 V |
| 5,121,628 | 6/1992 | Merkl et al. | 73/290 V |
| 5,264,831 | 11/1993 | Pfeiffer | 73/290 V |
| 5,363,341 | 11/1994 | Schwald et al. | 73/290 V |
| 5,452,611 | 9/1995 | Jones et al. | 73/290 V |

FOREIGN PATENT DOCUMENTS

| | | | |
|---|---|---|---|
| 28 33 997 | 2/1979 | Germany. | |
| 42 40 690 | 9/1993 | Germany. | |
| 43 11 963 | 10/1994 | Germany. | |
| 809681 | 3/1959 | United Kingdom | 367/908 |
| 84/01233 | 3/1984 | WIPO | 367/908 |
| 95/12804 | 5/1995 | WIPO. | |

OTHER PUBLICATIONS

W. Wersing et al. (1986). Dielectric, Elastic and Piezoelectric Properties of Porous PZT Ceramics.Ferroelectrics, vol. 68, pp. 77–97. Gordon and Breach Science Publishers S.A.

Primary Examiner—Scott Cummings
Attorney, Agent, or Firm—Bose McKinney & Evans

[57] ABSTRACT

For monitoring a predetermined level of a liquid in a container an ultrasonic transducer is fitted on the outer surface of the container wall at a measurement point situated at the height of the level to be monitored. The ultrasonic transducer when excited by an alternating voltage pulse having a given transmission frequency which equals the thickness resonant frequency of the container wall, transfers an ultrasonic transmission pulse to the container wall and converts ultrasonic vibrations, generated by reflected echo pulses, into electrical reception signals that are transferred to an evaluation circuit. In the evaluation circuit, on the one hand the presence or absence of echo signals is detected, and, on the other, the ultrasonic vibrations generated by the after-vibration of the container wall at the end of the transmission pulse are evaluated. As a result of this it can be determined with high error detection reliability whether the measurement point is covered by the liquid or not and whether the measurement arrangement is working satisfactorily.

12 Claims, 9 Drawing Sheets

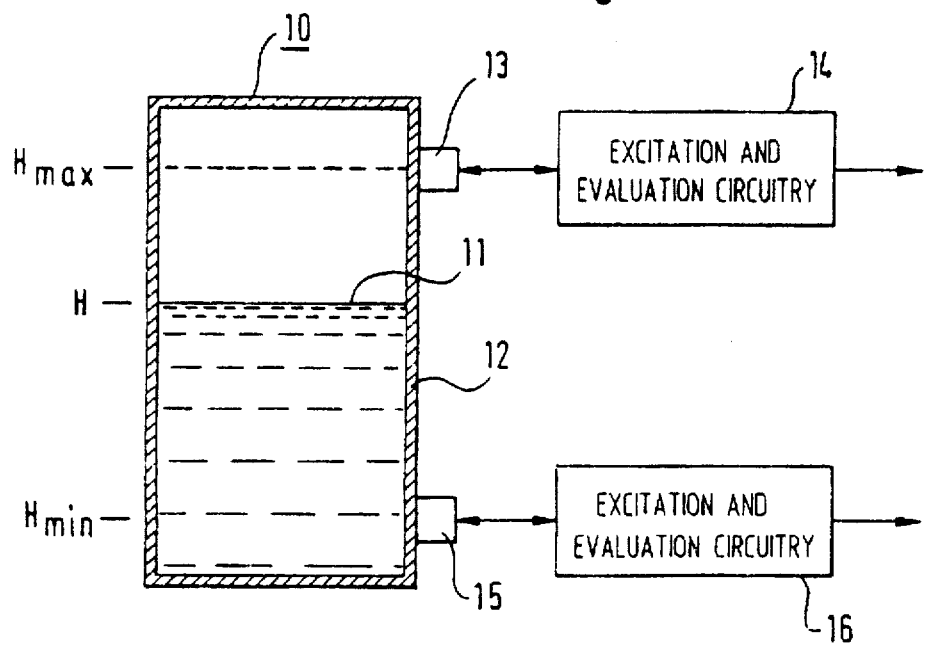
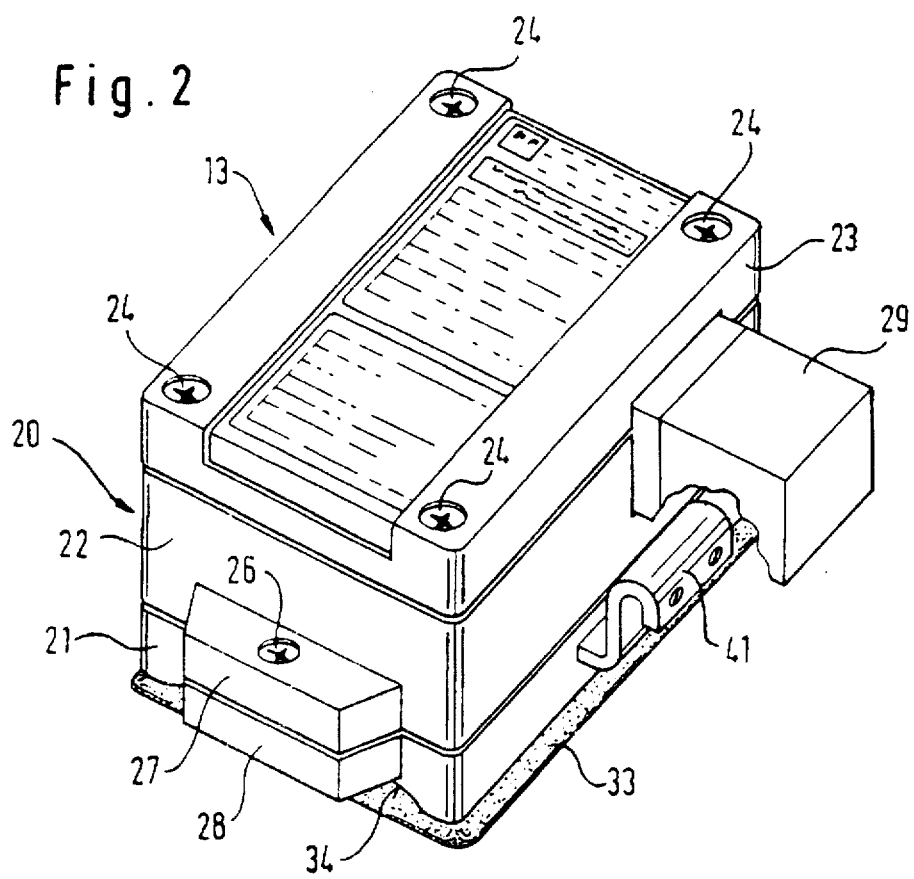

DEVICE FOR MONITORING A PREDETERMINED LEVEL OF A LIQUID IN A CONTAINER

BACKGROUND OF THE INVENTION

1. Field of the Invention

The invention relates to a device for monitoring a predetermined level of a liquid in a container comprising an ultrasonic transducer fitted on the outer surface of the container wall at a measurement point situated at the height of the level to be monitored and which, when excited by an alternating voltage pulse having a given transmission frequency, transfers an ultrasonic transmission pulse to the container wall and converts ultrasonic vibrations, generated by reflected echo pulses, into electrical reception signals that are transferred to an evaluation circuit which depending on whether echo signals are present or missing, determines whether the measurement point is covered by the liquid or not.

2. Description of the Prior Art

In such a device, known for example from the PCT publication WO 95/12804, monitoring the level is based on the following phenomena: when the measurement point is covered by the liquid ultrasonic waves are emitted into the liquid from the container wall due to the ultrasonic transmission pulse generated by the ultrasonic transducer, these waves propagating in the liquid and returning, following reflection at the opposing container wall, as an echo signal to the point on the container wall at which the ultrasonic transducer is fitted. The container wall ultrasonic vibrations generated by the echo signal are converted by the ultrasonic transducer into an electrical alternating signal which is applied to the evaluation circuit. Thus, the evaluation circuit receives an electrical echo pulse in a time interval following emission of the transmission pulse which corresponds to the transit time of the ultrasonic waves in the liquid in travelling to the opposing container wall and back again. From the appearance of the echo pulse in this time interval following the transmission pulse the evaluation circuit thus determines that the measurement point is covered by the liquid and it indicates that the level to be monitored is attained or exceeded. When, on the other hand, the measurement point is not covered by the liquid, it instead being in contact with the air above the liquid level, the evaluation circuit receives no echo pulse in the same time interval following emission of a transmission pulse. This is due primarily to the emission of ultrasonic waves in air being very small as a result of the large difference in the acoustical impedances of the container wall and the air. Should nevertheless a weak echo be detected, it would appear substantially later due to the large difference in the speeds of sound in liquids and air. From the absence of the echo pulse in the anticipated time of reception the evaluation circuit determines that the measurement point is not covered by the liquid and it indicates that the level to be monitored in the container is not attained.

This known method is not safe from errors. Namely, in the absence of the echo pulses the system is unable to determine whether this is really due to the level to be monitored not being attained, or whether it is due to some other cause. For example, a defect in circuit components, an open circuit or similar faults will also result in no echo pulses being detected, even though the measurement point is covered by the liquid. It may also be the case that the conditions for propagation of the ultrasonic waves are temporarily disturbed, for instance, due to the formation of air bubbles during a filling procedure. In such cases again no echo pulses would be detected and the evaluation circuit would indicate that the level to be monitored in the container has not been attained, even though in actual fact the measurement point is covered by the liquid.

SUMMARY OF THE INVENTION

The object of the invention is to provide a device of the aforementioned kind which exhibits high error detection reliability.

This is achieved according to the invention in that the ultrasonic transducer is excited by a transmission frequency which equals the thickness resonant frequency of the container wall and in that in the evaluation circuit also the ultrasonic vibrations generated by the after-vibration of the container wall after the end of the transmission pulse are detected in order to establish whether the measurement point is covered by the liquid or not.

In the method according to the invention detection is based on the fact that the thickness vibrations of the container wall fail to instantly cease at the end of the transmission pulse, they instead gradually dying out due to the after-vibration of the container wall. The duration of the after-vibration depends on whether the measurement point on the container wall is covered by liquid or not. In the case of a covered measurement point the vibrations are more strongly attenuated than when the measurement point is not covered, thus dying out quicker. The after-vibration of the container wall is converted by the ultrasonic transducer into an electrical alternating signal which is likewise applied to the evaluation circuit. When the evaluation circuit determines in a certain time interval after the end of the transmission pulse that the signal originating from the after-vibration is missing, it recognizes therefrom that the measurement point is covered by the liquid, i.e. that the level to be monitored has been attained or exceeded. When, in contrast, in the same time interval after the end of the transmission pulse the signal originating from the after-vibration is present, then it determines that the measurement point is not covered by the liquid, i.e. that the level to be monitored has not been attained.

The two signals detected by the evaluation circuit, namely the echo signal and the after-vibration signal, are complementary to each other to a certain degree: when the measurement point is covered, the echo signal is present, but the after-vibration signal is missing; when the measurement point is not covered, the after-vibration signal is present, but the echo signal is missing. Thus, for each of these two states a signal value exists which furnishes a positive and reliable indication as to the level. When one of the two signals is missing due to a faulty status of the container or sensing device, but the other signal is present, then the existing signal is still a correct indication of the level. When, by contrast, the level has the status in which also the other signal, having no fault as such, is missing, then the simultaneous absence of both signals indicates that an error status exists. As soon as it is defined which of the two signals is in error, sensing can be continued with the other signal alone, the error detection reliability still being the same as with conventional sensing devices. When, of course, both signals are missing due to a faulty status of the container or the sensing device, then this error status is also indicated by the simultaneous absence of both signals.

These advantageous properties are achieved at slight additional expense since almost all of the components of the excitation and evaluation circuitry are used in common in obtaining the two signals. Experience has shown that the excitation of the container wall at its thickness resonant frequency is an optimum not only for obtaining the after-vibration signal but also for obtaining the echo signal.

Advantageous embodiments and further aspects of the invention are characterized in the sub-claims.

BRIEF DESCRIPTION OF THE DRAWING

Further features and advantages of the invention are evident from the following description of an example embodiment with reference to the drawings in which:

FIG. 1 is a schematic illustration for explaining the monitoring of predetermined levels of a liquid in a container, FIG. 2 is a perspective view of an embodiment of the ultrasonic sensor used in the invention.

DESCRIPTION OF THE PREFERRED EMBODIMENT

Figure 3:
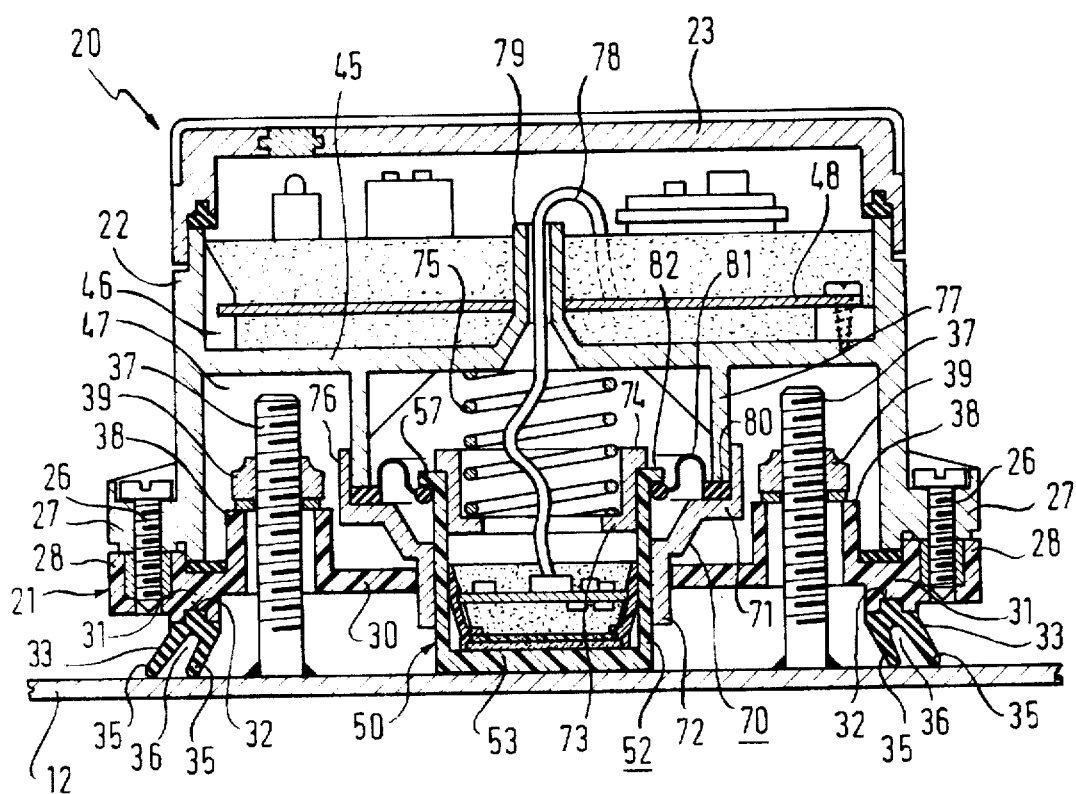
FIG. 3 is a longitudinal section through the ultrasonic sensor of FIG. 2 when attached to a flat container wall.

FIG. 1 shows a container 10 which is filled up to a level H with a liquid 11. The level H at which the surface of the liquid 11 is located above the bottom of the container 10, is the momentary level in the container. The level is required not to exceed a maximum level $H_{max}$ and not to drop below a minimum level $H_{min}$. Each of these limit values of the level is also termed "limit level".

Attached to the outer surface of the container wall 12 for monitoring the upper limit level $H_{max}$ is a level sensor 13 which is connected to an excitation and evaluation circuitry 14. Attached to the outer surface of the container wall 12 for monitoring the lower limit level $H_{min}$ is a level sensor 15 which is connected to an excitation and evaluation circuitry 16. Each of the two sensors 13 and 15 is configured so that with the aid thereof it can be defined through the container wall 12 whether the liquid 11 in the container 10 is at the level of the sensor 13 and 15, respectively, or not. For this purpose each of the two sensors 13 and 15 is configured as an ultrasonic sensor which is able, when excited by an electrical alternating voltage pulse furnished by the corresponding excitation and evaluation circuitry 14 and 16, respectively, to send an ultrasonic pulse to the container wall 12 and to convert received ultrasonic signals into electrical alternating voltage signals which are transferred to the circuitry 14 and 16, respectively. The circuitry 14 and 16, respectively, evaluates the received signals and provides at the output a signal which indicates whether the level in the container 10 lies above or below the limit level to be monitored. To establish this it is thus not necessary to provide an opening in the container wall 12 or to introduce the sensor into the sensors 14 and 16 are also not in direct contact with the liquid 11.

The two sensors 13 and 15 as well as the associated electronic circuitries 14 and 16, respectively, are configured absolutely identical. Accordingly, in the following the description relates merely to the sensor 13 and the circuitry 14, this description applying just the same to the sensor 15 and the circuitry 16.

Figure 4A:
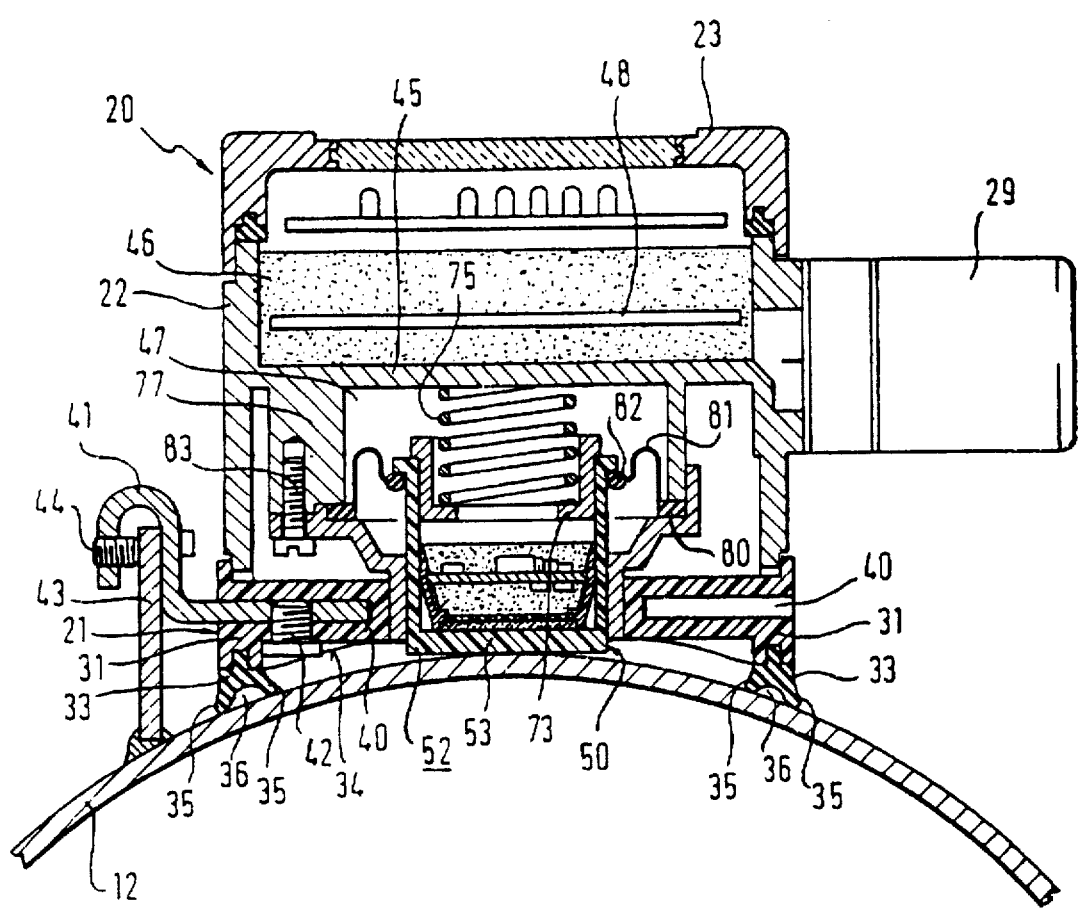
FIG. 4(a) is a cross-section through the ultrasonic sensor of FIG. 2 when attached to a cylindrical container wall showing an embodiment of the attachment for the sensor.
Figure 4B:
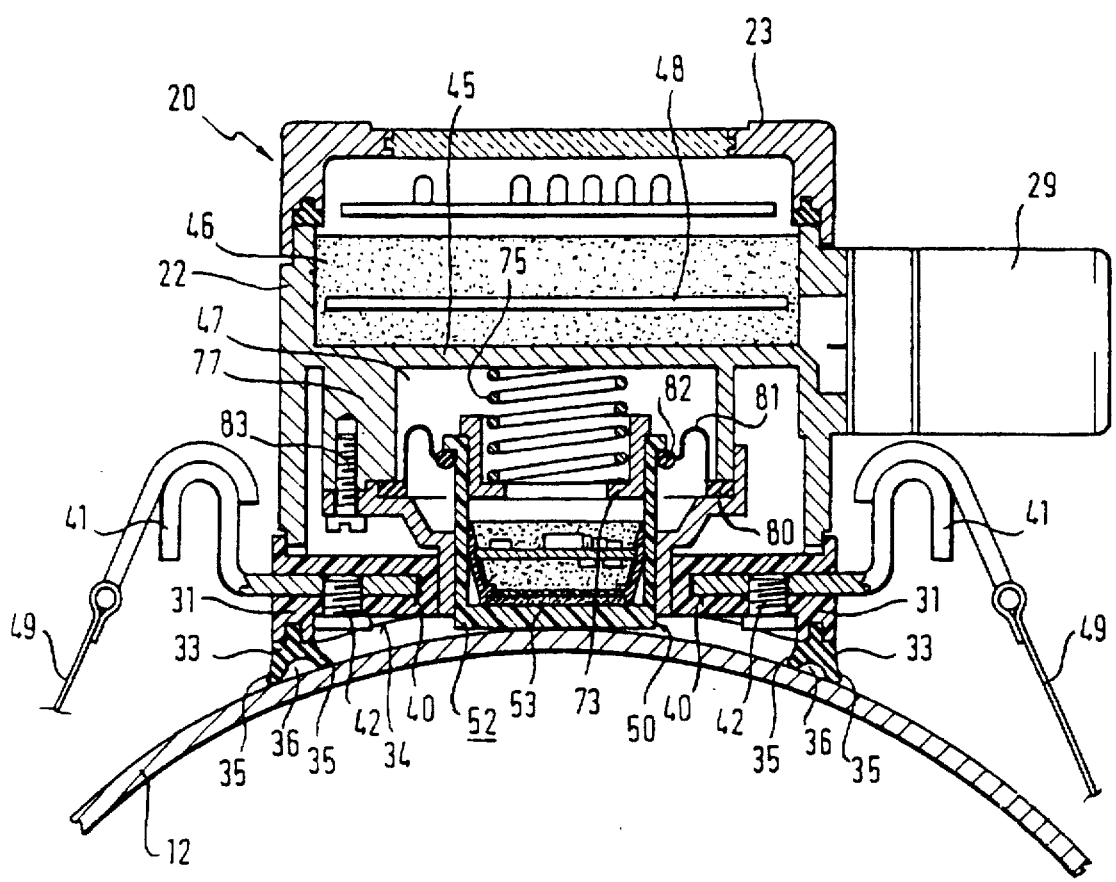
FIG. 4(b) is a cross-section through the ultrasonic sensor of FIG. 2 when attached to a cylindrical container wall showing another embodiment of the attachment for the sensor.

FIG. 2 shows a perspective view of the sensor 13, and the FIGS. 3, 4(a) and 4(b) show section views of the sensor 13 secured to the container wall 12. FIG. 3 shows a longitudinal section of the sensor 13 for the case that the container wall is flat, and FIG. 4 shows a transverse section through the sensor for the case that the container wall is cylindrical. The excitation and evaluation circuitry 14, which in FIG. 1 is illustrated separately from the the sensor 13 for the sake of clarity, is assembled together with the sensor 13 in the embodiment illustrated in FIGS. 2 to 4(a) and 4(b).

The sensor shown in FIG. 2 consists of a sensor block 20, containing all components of the ultrasonic sensor and the excitation and evaluation circuitry, and of an adapter 21 which serves to secure the sensor block 20 to containers of differing shape and size as well as of differing materials. The sensor block 20 has a sensor housing 22 which is closed off by a cover 23 secured to the sensor housing 22 by means of screws 24. The sensor block 20 is secured to the adapter 21 by means of screws 26 which pass through holes in the protuberances 27 on the narrow sides of the sensor housing 22 and are screwed into tappings in corresponding protuberances 28 on the adapter 21. After having released the two screws 26 the complete sensor block can be removed from the adapter 21 secured to the container wall 12. Vice-versa for fitting a sensor, the adapter 21 is secured without the sensor block 20 to the desired location of a container wall by suitable means and subsequently the sensor block 20 with the ultrasonic sensor assembled ready for operation is mounted on the adapter 21 and secured by means of the screws 26. A terminal block 29 projecting from one side of the sensor housing 22 permits connecting the circuitry accommodated in the sensor housing 22 to outer connecting leads.

The adapter 21 is a plastics moulding substantially comprising a plate 30, the contour of which corresponds to the contour of the sensor housing 22, i.e. in the example shown, rectangular. Molded around the plate 30 is a frame 31 which is provided on the side facing the container wall with a groove 32 into which a seal 33 is inserted. On the longitudinal sides of the adapter 21, which in the case of a cylindrical container 10 rest on the container wall 12 along the generatrices, the frame 31 has a consistent height. On the transverse sides which in the case of a cylindrical container 10 rest on the container wall 12 along the periphery, the frame 31 includes a recess 34 in the shape of a circular arc as is evident in FIG. 2 on the front transverse side thereof. The radius of curvature of the recess 34 corresponds to the radius of the container wall 12 of a container 10 having the smallest diameter at which the adapter 21 is to be attached.

When the ultrasonic sensor 13 is intended for containers, the nominal width (diameter) of which amounts to at least 200 mm, the radius of curvature of the recess 34 is thus 100 mm.

The seal 33 is configured so that its sealing surface intended for contact with the container wall lies in a plane when the adapter 21 is not yet applied to the container wall 12 and thus the seal 33 is still to change shape. So that this requirement is satisfied the seal 33 has a consistent height along the longitudinal sides of the frame 31, while its height in the region of each transverse side increases in keeping with the shape of the recess 34 in the shape of a circular arc towards the center. As evident from the FIGS. 3, 4(a) and 4(b) the seal 33 is preferably configured with two sealing lips 35, between which a notched recess 36 exists. The sealing lips 35 are relatively low along the longitudinal sides of the frame 31 FIGS. 4(a) and 4(b) and the depth of the notched recess 36 is at this location correspondingly small, whereas along the transverse sides of the frame 31 the height of the sealing lips 35 and the depth of the notched recess 36 increase to the same extent as the height of the seal 33. Since the section plane of the sectioned view of FIG. 3 passes through the locations at which the recesses 34 are deepest, the sealing lips 35 have in this section view a maximum height and the notched recesses 36 a maximum depth.

When the adapter 21 is secured to a flat container wall 12 (FIG. 3) the sealing lips 35 are pressed together in the region of the recesses 34 to the same extent as in the region of the straight longitudinal sides of the frame 31, i.e. relatively slightly, whereas when the adapter 21 is secured to a cylindrical container wall 12 FIGS. 4(a) and 4(b), the sealing lips change shape more in the region of the recesses 34 than in the region of the straight longitudinal sides of the frame 31, i.e. all the more, the smaller the radius of curvature of the container wall is. This more pronounced change in shape is made possible by the greater height of the sealing lips 35 and the greater depth of the notched recess 36 in this region. In all cases, however, the sealing lips 35 are in sealing contact with the container wall along the entire periphery of the adapter 21.

The section view of FIG. 3 shows a first possibility of securing the adapter 21 to the container wall 12: welded to the container wall 12 are stud bolts 37 which protrude through the openings of bushes 38 formed integrally with the plate 30 of the adapter 21. Screwed onto the ends of the stud bolts 37 protruding from the bushes 38 are nuts 39 which tension the plate 30 while pressing the seal 31 together against the container wall 12. If required, spacers protruding downwards to the container wall 12 may be formed on the plate 30 which determine a defined spacing of the plate 30 from the container wall 12 and thus a defined position of the adapter 21 as regards the container wall 12.

In FIG. 4(a) another way of securing the adapter 21 to the container wall 12 is illustrated. For this purpose one leg of an angular bracket 41 formed of heavy gauge sheet metal is inserted in a side slot 40 provided in the middle of each longitudinal side of the adapter 21 and secured therein by a screw 42. The other leg of the angular bracket 41, which is upswept at a right angle, is bent hook-shaped at the end. This hook-shaped bent end clasps a rail 43 which is welded to the container wall 12 and it is clamped firmly in place to the rail 43 by means of at least one screw 44. This kind of fastening permits defining the position at which the sensor 13 is to be applied to the container 10 by simple means and, where necessary, to subsequently change the position by shifting the adapter 21 along the rail 43. It will be understood from FIG. 4(a) that a similar angular bracket 41 is inserted in a side slot 40 on the opposite side of the adapter 21 although the other bracket 41 is not shown in FIG. 4(a).

It is shown in FIG. 4(b) that it is also possible to secure the adapter 21 by means of a clamping strap 49 placed around the container. For this purpose an angular bracket 41 is inserted in each of the slots 40 on both sides of the adapter 21 and hook-shaped brackets are hooked onto the bent upper end of the upswept legs of the two angular brackets 41, these brackets being provided at the ends of the clamping strap 49 placed around the container. Such a clamping strap fastening provides an even greater freedom of choice in selecting the location to apply the sensor 13 to the container 10 and has additionally the advantage that no intervention needs to be undertaken on the container itself. Hooking the clamping strap 49 into place at the two upper ends of the upswept legs of the angular bracket 41 results in the points at which the force exerted by the clamping strap 49 is applied lie relatively high on the adapter 21. This is of advantage because particularly in the case of containers having a large radius of curvature the components of the force pressing against the container significantly increase with the height of the point of application.

The stud bolts 37 or the rails 43 may be secured to the container wall 12 instead of by welding also by adhesive bonding, this type of securement of the adapter 21 also being suitable for containers of a plastics material.

The sensor housing 22 is divided into two spaces 46 and 47 by a transverse wall 45. In the outer space 46 facing away from the container wall 12 the excitation and evaluation circuitry 14 is accommodated which in the usual way is made up of electronic components which are mounted on a circuit board 48. In the inner space 47 facing the container wall 12 and the adapter 21 the components of the ultrasonic sensor 13 are fitted, to which in particular an electroacoustical transducer 50 belongs which serves to convert an alternating voltage pulse furnished by the excitation and evaluation circuitry into an ultrasonic pulse which is transferred to the container wall 12, and to convert ultrasonic vibrations which it receives from the container wall 12 into an electrical alternating voltage which is transferred to the excitation and evaluation circuitry.

Figure 5:
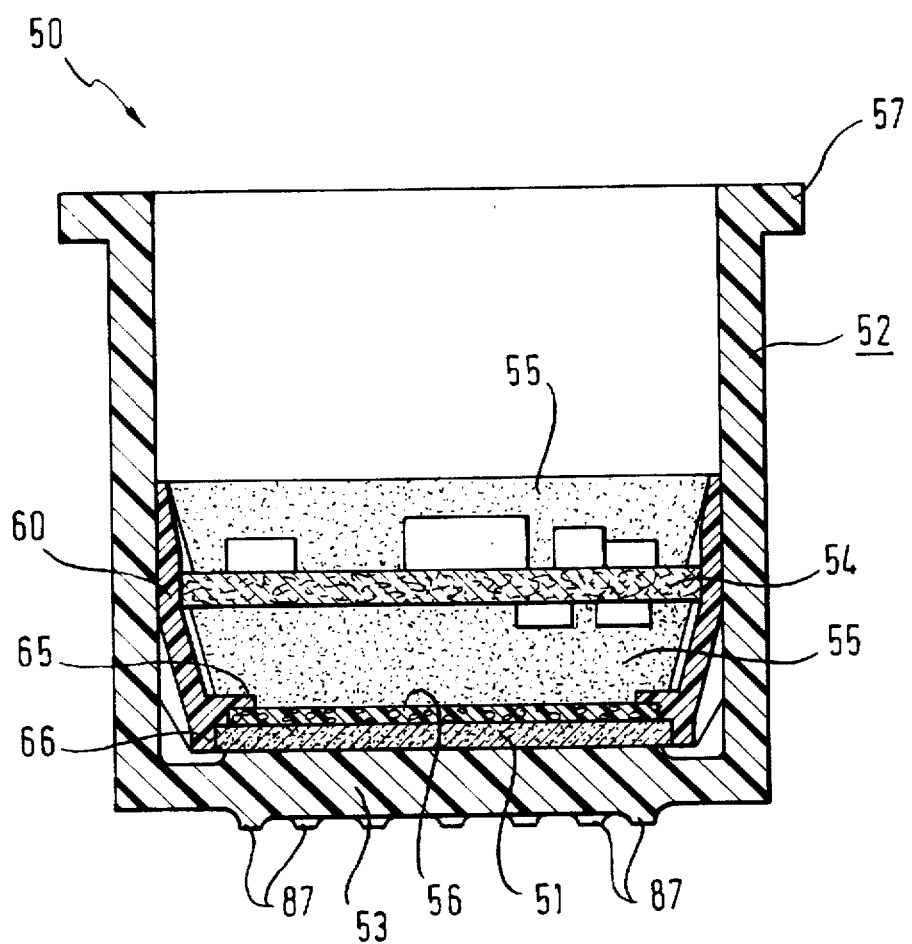
FIG. 5 is a section view of the ultrasonic transducer used in the ultrasonic sensor of FIGS. 2 to 4.

The electroacoustical transducer 50 is illustrated in more detail in FIG. 5. It contains as the active component a piezoelectric element 51 which in the known way is a slice of a piezoelectric crystal on both sides of which metallizations are applied which serves as electrodes. When an alternating voltage is applied to the electrodes, the piezoelectric crystal is excited to produce physical vibrations at the frequency of the alternating voltage, and when physical vibrations are transferred to the piezoelectric crystal it produces between the electrodes an alternating voltage having the frequency of the physical vibrations. In FIG. 5 the electrodes are not illustrated since due to the minute thickness of the metallization as compared to the thickness of the piezoelectric crystal they are not visible.

The piezoelectric element 51 is arranged in the interior of a pot-shaped transducer housing 52 and is in contact with the bottom 53 of the transducer housing 52 which simultaneously forms the diaphragm of the ultrasonic transducer 50. The transducer housing 52 is made of a plastics material.

On the side of the piezoelectric element 51 facing away from the diaphragm 53 a circuit board 54 is arranged which carries the components of a circuit serving to couple the piezoelectric element 51 to the excitation and evaluation circuitry 14. The circuit board 54 is located spaced away from the piezoelectric element 51, and the space between the circuit board 54 and the piezoelectric element 51 is filled with a potting compound 55 which is filled in fluid condition and then solidifies. The side of the piezoelectric element 51 facing away from the diaphragm 53 is covered by a disk 56 of a closed-pore foamed material which prevents the potting compound 55 from coming into direct contact with the piezoelectric element 51. Also the space above the circuit board 54 is filled up to such a level with the potting compound 55 that all circuit components mounted on the circuit board 54 are embedded in the potting compound 55. The potting compound 55 is prescribed for reasons of explosion-protection, it in addition effecting dampening of ultrasonic waves emitted to the side opposite the diaphragm 53.

Figure 6:
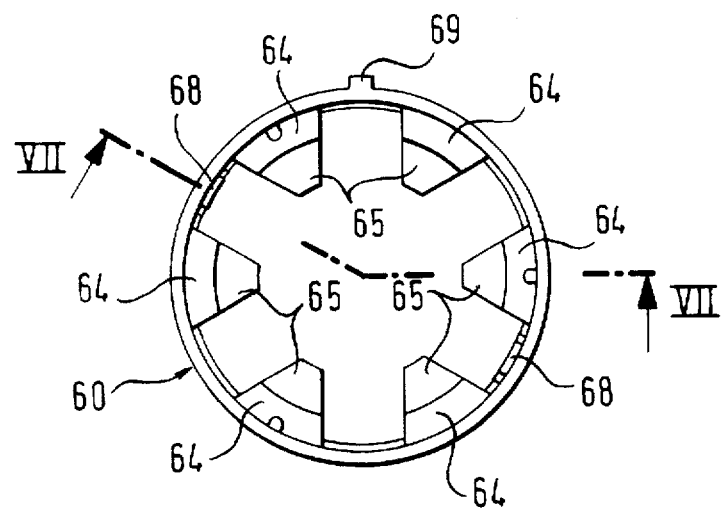
FIG. 6 is a plan view of a mounting sleeve used in the ultrasonic transducer of FIG. 5.
Figure 7:
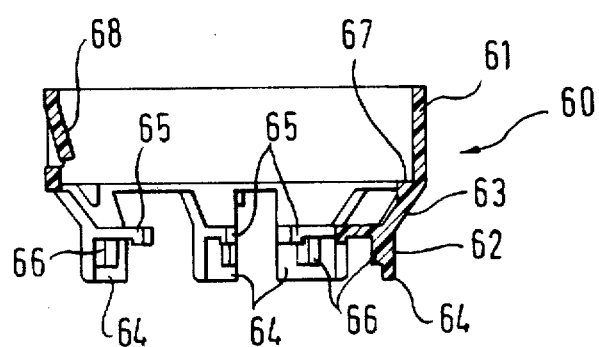
FIG. 7 is a section view of the mounting sleeve of FIG. 6.
Figure 8:
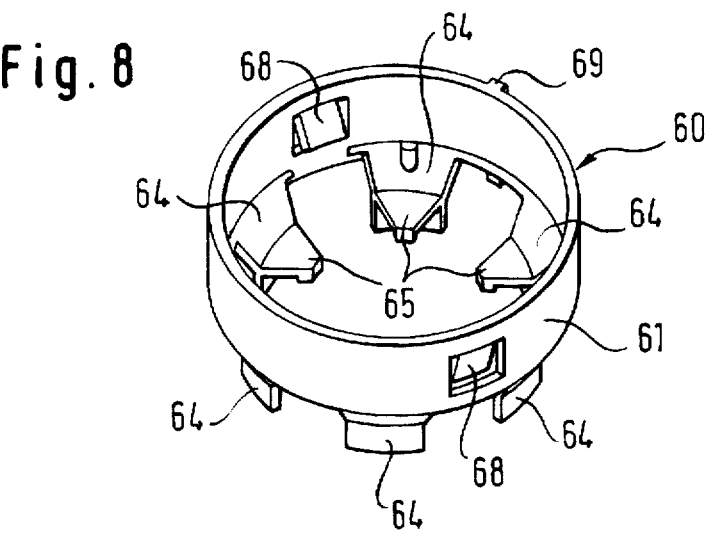
FIG. 8 is a perspective view of the mounting sleeve of FIGS. 6 and 7.

To facilitate installing the piezoelectric element 51 and the circuit board 54, as well as encapsulating these parts, a mounting sleeve 60 is provided which is illustrated in more detail in the FIGS. 6, 7 and 8. The mounting sleeve 60 is a molding of a plastics material which is shown in FIG. 6 in the plan view, in FIG. 7 in longitudinal section along the broken line A—A of FIG. 6 and in FIG. 8 in a perspective view. The mounting sleeve 60 has a widened cylindrical section 61, a narrowed cylindrical section 62 of smaller diameter and a conical section 63 between the two cylindrical sections 61 and 62. The outer diameter of the widened cylindrical section 61 corresponds to the inner diameter of the pot-shaped transducer housing 52, and the inner diameter of the narrower cylindrical section 62 corresponds to the diameter of the piezoelectric element 51. The narrower cylindrical section 62 and the conical transition section 63 are divided into six segments 64 by cutouts. At each segment 64, a paw 65 protruding radially inward is formed at the transition between the cylindrical section 61 and the conical section 63. Below each paw 65 an abutment nose 66 is formed which extends downwards only over a part of the height of the cylindrical section 62 and protrudes only slightly downwards radially. At the transition between the conical section 63 and the widened cylindrical section 61 a shoulder 67 is formed. In the wall of the widened cylindrical section 61 at each of two positions diametrally opposed to each other by cutouts a flexible latch 68 is formed, the free end of which protrudes slightly inwards and is located a distance away from the shoulder 67 which corresponds to the thickness of the circuit board 54. A rib 69 formed on the periphery of the widened cylindrical section 61 engages a corresponding groove in the transducer housing 52, as a result of which the mounting sleeve 60 is prevented from turning in the transducer housing 52.

The described configuration of the mounting sleeve 60 permits simple, speedy and precise assembly of the components of the ultrasonic transducer 50 outside of the transducer housing 52. The piezoelectric element 51 with the disk 56 of a closed-pore foamed material placed thereon is introduced into the narrowed cylindrical section 62 from underneath until the piezoelectric element 51 comes up against the ends of the abutment noses 66, thus precisely defining the radial and axial position of the piezoelectric element 51 in the mounting sleeve 60. The diameter of the foamed material disk 56 is somewhat smaller than the diameter of the piezoelectric element 51 and corresponds to the spacing between two abutment noses 66 located diametrally opposed to each other, and the thickness of the foamed material disk 56 corresponds to the height of the abutment noses 66. Accordingly, the paws 65 locate on the upper side of the foamed material disk 56 when the piezoelectric element 51 is introduced to abutment in the mounting sleeve 60, and the abutment noses 66 locate on the periphery of the foamed material disk 56. As a result of this the radial and axial position of the foamed material disk 56 is precisely defined in the mounting sleeve 60, and the foamed material disk 56 is maintained by the paws 65 in close contact with the upper side of the piezoelectric element 51.

The circuit board 54 is circular and has a diameter corresponding to the inner diameter of the widened cylindrical section 61 of the mounting sleeve 60. It is introduced from above into the widened cylindrical section 61 until it rests on the shoulder 67. During insertion the latches 68 are forced outwards by the peripheral edge of the circuit board 54 until the peripheral edge of the circuit board 54 has passed the ends of the latches 68. Then, due to their elasticity, the latches 68 snap back inwards so that they clasp the upper side of the circuit board 54 and hold the latter firmly on the shoulder 67, as a result of which the position of the circuit board 54 is fixed in the axial and radial direction in the mounting sleeve 60. The mounting sleeve 60 is then ready for being installed in the transducer housing 52. For this purpose a drop of a hot-curable adhesive is first applied to the bottom 53 of the transducer housing 52, and subsequently the mounting sleeve 60 is inserted into the transducer housing 52 until the piezoelectric element 51 comes into contact with the bottom 53, the adhesive thereby being distributed in a thin layer between the surfaces of the piezoelectric element 51 and the bottom 53 facing each other. The adhesive is then hardened by being heated, the mounting sleeve 60 being weighted down by a weight so that a defined layer of adhesive is attained. The layer of adhesive ensures the contact between the piezoelectric element 51 and diaphragm of the ultrasonic transducer 50 formed by the bottom 53 and it prevents the formation of a layer of air between these parts.

The potting compound 55 is then filled into the mounting sleeve 60 from above. This potting compound flows through openings provided therefor in the circuit board 54 also into the space between the circuit board 54 and the foamed material disk 56. The foamed material disk 56 prevents the potting compound 55 from coming in contact with the upper side of the piezoelectric element 51. The paws 65 which force the edge of the foamed material disk 56 onto the upper side of the piezoelectric element 51 prevent the potting compound 55 from creeping between the foamed material disk 56 and the piezoelectric element 51.

Serving installation of the pot-shaped transducer housing 52 in the sensor housing 22 is a mounting part 70 having a flange 71 on which a guide bush 72 is formed. The transducer housing 52 is pushed into the guide bush 72, the inner diameter of which corresponds to the outer diameter of the transducer housing 52 so that the transducer housing 52 is a sliding fit in the guide bush 72. The collar 57 on the transducer housing 52 prevents the transducer housing 52 from emerging from the guide bush 72. In the open end of the transducer housing 52 a spring cup 73 is inserted which in turn features a collar 74 supported by the end of the transducer housing 52. The spring cup 73 receives the one end of a coil compression spring 75. Running around the edge of the flange 71 is a collar 76, the inner diameter of which corresponds to the outer diameter of a carrier tube 77 formed on the transverse wall 45.

Prior to attaching the mounting part 70 to the carrier tube 77 a connecting lead 78, which is soldered to the circuit board 54 and is intended to connect the ultrasonic transducer 50 to the excitation and evaluation circuitry 16, is inserted through a tube socket 79 standing off from the transverse wall 45 to the opposing side. On the flange 71 a sealing ring 80 is placed to which the outer edge of an annular cuff 81 is secured, the inner edge of which is connected to an elastic ring 82 placed around the transducer housing 52. Then, the collar 76 is placed over the carrier tube 77 and the flange 71 is secured by means of screws 83 which are screwed into the thickened wall sections of the carrier tube 77 and of which one is to be seen in FIG. 4. The coil compression spring 75 is dimensioned so that it is compressed between the spring cup 73 and the transverse wall 45 to achieve a desired pretension when the mounting part 70 is secured to the carrier tube 77.

Following this, the connecting lead 78 can be soldered to the terminals provided on the circuit board 48, and the outer space 41 can be filled with a potting compound practically up to the level of the tube socket 79. The tube socket 79 prevents potting compound from flowing into the inner space 42.

The sensor block 20 is now fitted ready for operation and it can be secured to the adapter 21. For this purpose the guide bush 72 is inserted through an opening in the plate 30 of the adapter 21 so that the bottom of the transducer housing 72, i.e. the diaphragm 53 of the ultrasonic transducer 50, is in contact with the outer surface of the container wall 12. When the sensor block 20 is moved in the direction of the adapter 21, the transducer housing 52 is firmly held by the container wall 12 so that it is shifted into the guide bush 72, as a result of which the spring 75 is further compressed. Once, in conclusion, the sensor block 20 has been secured to the adapter 21 by means of the screw 26, the diaphragm 23 is urged against the container wall 12 by the force defined by the spring 75.

It will be appreciated from comparing the FIGS. 3, 4(a) and 4(b), that in applying the sensor 13 to a flat container wall 12 (FIG. 3) the ultrasonic transducer 50 protrudes further from the guide bush 72 than in the case of a curved container wall 12 FIGS. 4(a) and 4(b), the contact of the diaphragm 53 with the container wall 12 being assured in each case by the force defined by the spring 75.

For satisfactory functioning of the ultrasonic sensor and achieving a good efficiency it is a substantial requirement that a good acoustical coupling exists, on the one hand, between the piezoelectric element 51 and the diaphragm 53 and, on the other hand, between the diaphragm 53 and the container wall 12, it being particularly a substantial requirement that no layers of air exist between these parts since these would result in high jumps in the acoustical impedance on the way from the piezoelectric element 51 to the container wall 12 and back. The preferred embodiment of the diaphragm 53 with which this good acoustical coupling can be achieved will now be explained on the basis of FIGS. 9 and 10.

Figure 9:
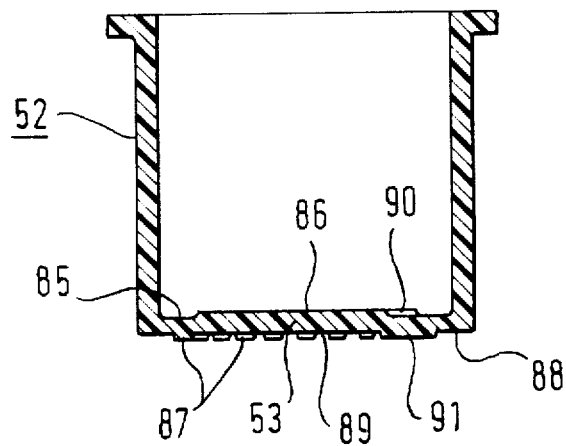
FIG. 9 is a section view of the empty transducer housing of the ultrasonic transducer of FIG. 5.

It is evident from the section view of the transducer housing 52 in FIG. 9 that on the inside of the diaphragm 53 a depression 85 is formed a round the periphery which surrounds the active diaphragm region 86 on which the piezoelectric element 51 rests. As already explained, for preventing any air layer whatsoever between the piezoelectric element 51 and the active diaphragm region 86 prior to the mounting sleeve 60 being inserted into the transducer housing 52, an adhesive is applied to the exposed surface of the piezoelectric element 51 which, when the piezoelectric element 51 is pressed on the active diaphragm region 86 on insertion of the mounting sleeve 60, is distributed between the surfaces facing each other of these two parts. The depression 85 serves to receive excess adhesive displaced from the space between the piezoelectric element 51 and the active diaphragm region 86. Preferably a hot-curable adhesive is used, since this does not lose its properties even at high operating temperatures.

Figure 10:
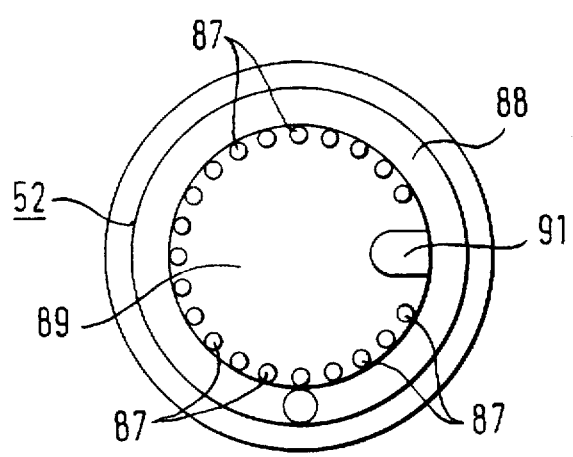
FIG. 10 is a view of the outside of the diaphragm formed by the bottom of the transducer housing of FIG. 9.

On the outside of the diaphragm 53 a series of protuberances 87 is formed, arranged in a circular ring coinciding roughly with the periphery of the active diaphragm region 86 (FIG. 10). In the example illustrated the protuberances 87 have the form of round pimples. The annular region 88 of the diaphragm 53 located outside of the ring of protuberances 87 is slightly recessed with respect to the diaphragm surface 89 located within the ring. On the inside of the diaphragm 53 a depression 90 is evident in FIG. 9 which serves to receive the solder junction through which a connecting lead is connected to the electrode of the piezoelectric element 51 located on the diaphragm. A correspondingly flared protuberance 91 is located on the outer surface of the diaphragm 53 opposite to this depression.

In fitting the sensor 13 to the container wall 12, i.e. in the example as previously described in fitting the sensor block 20 to the adapter 21, a coupling layer is inserted between the diaphragm 53 and the container wall 12, this coupling layer being of a material which prevents the formation of an air layer between the diaphragm 53 and the container wall 12 and provides a good acoustical coupling between the diaphragm and the container wall. The protuberances 87 which come into direct contact with the container wall 12 determine the thickness of the coupling layer.

A material suitable for the coupling layer is, for instance, the silicone gel commercially available under the tradename Wacker SilGel 612. This is a 2-component silicone rubber which after mixing of the two components solidifies into a very soft, gel-like vulcanized material by additive crosslinking. This material is after mixing of the two components initially very thin which is unfavorable since it poses the risk of flowing away prematurely when applied to the diaphragm surface 89, prior to the diaphragm 53 being placed on the container wall 12. This is why the silicone gel is reinforced preferably by the admixture of glass fibers, for example in a proportion of 50% by volume. These glass fibers may have a diameter of 30 μm and a length of 400 μm. Due to the glass fibers the viscosity of the silicone gel is increased so that premature flow off is prevented. In addition to this the glass fibers also enhance the acoustical impedance of the coupling layer which is favorable since it then approaches the acoustic impedance of the plastics diaphragm 53.

When mounting the diaphragm 53 on a flat container wall 12 excess material of the coupling layer is able to be displaced through the spaces between the protuberances 87. For this reason it is not advisable to provide a closed ring as a spacer for determining the thickness of the coupling layer.

When the diaphragm 53 is mounted on a cylindrical container wall 12, contact materializes between the protuberances 87 and the container wall 12 substantially only along a generatrix of the container. The only aspect important for proper functioning of the ultrasonic sensor is the situation existing along this line of contact; in this case, too, the protuberances 87 determine the thickness of the coupling layer along this line of contact.

It is a substantial requirement for the good coupling achieved by the coupling layer between the diaphragm 53 and the container wall 12 that the diaphragm is made of a plastics material, because the acoustical impedance of the plastics diaphragm and that of the coupling layer are of the same order of magnitude so that no large jumps in impedance materialize. This permits using a relatively thick coupling layer. The thicker the coupling layer the better is the thermal and physical stability of the sensor. Upwardly the thickness of the coupling layer is limited by the fact that its thickness resonance is required to be above the ultrasonic frequency applied. When using the aforementioned glass-fiber reinforced silicone gel the thickness of the coupling layer and thus the height of the protuberances may amount to about 0.2 mm.

Since the diaphragm 53 is part of the transducer housing 52, the complete transducer housing 52 must be made of a plastics material which is suitable for the diaphragm 53. One substantial requirement on the material of the diaphragm is that the dynamic glass transition point, i.e. the temperature at which the plastics material makes the transition from the crystalline phase into the amorphous phase, is to be above the highest operating temperature occuring. Particularly good results have been obtained with polyether etherketone (PEEK).

Figure 11:
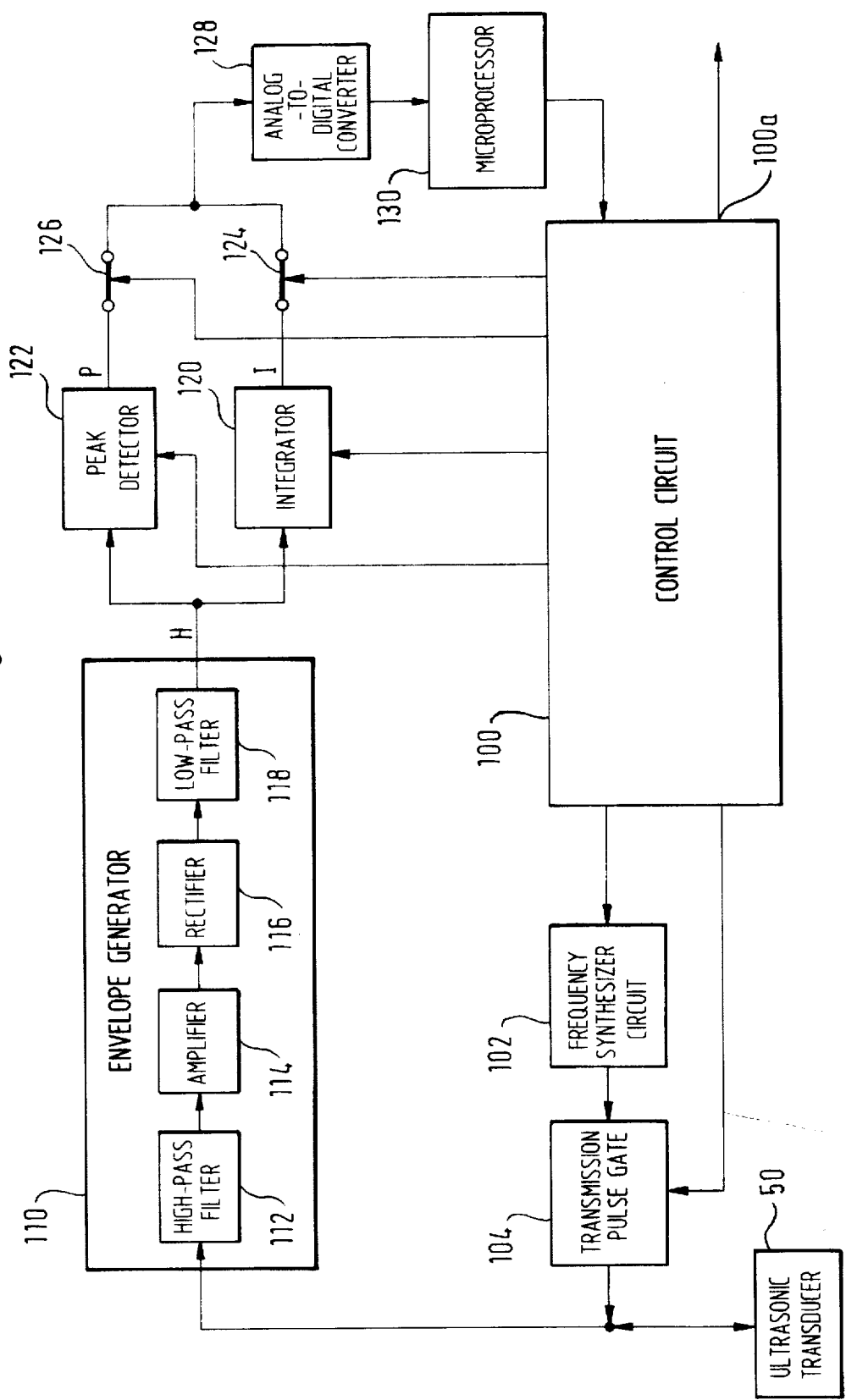
FIG. 11 is the block diagram of an embodiment of the excitation and evaluation circuitry of the ultrasonic sensor and FIGS. 12(a) and 12(b) shows signal time plots for explaining how the excitation and evaluation circuit of FIG. 11 functions.

FIG. 11 shows a simplified block diagram of the excitation and evaluation circuitry 14. The ultrasonic transducer 50 is depicted symbollically by a circuit block.

A control circuit 100 controls all functions of the various circuit components. Belonging thereto is a frequency synthesizer circuit 102 which generates an electrical alternating voltage having the frequency which the ultrasonic signal generated by the ultrasonic transducer 50 is required to have. This frequency is determined by a control signal which is applied by the control circuit 100 to a control input of the frequency synthesizer circuit 102.

The output of the frequency synthesizer circuit 102 is connected to the signal input of a transmission pulse gate 104 which at its control input receives from the control circuit 100 an opening pulse every time the ultrasonic transducer 50 is required to generate an ultrasonic pulse. The transmission pulse gate 104 is opened by the opening pulse so that the alternating voltage generated by the frequency synthesizer circuit 102 is applied to the ultrasonic transducer 50 for the duration of the opening pulse.

At the receiving end the terminal of the ultrasonic transducer 50 is connected to the input of an envelope generator 110 which contains in a series arrangement a high-pass filter 112, an amplifier 114, a rectifier 116 and a low-pass filter 118. The high-pass filter 112 passes only frequencies above the lower working frequency of the ultrasonic transducer 50. The amplifier 114 amplifies the output signal of the high-pass filter 112 for no-problem rectification. By means of the rectifier 116 and the output low-pass filter 118 the envelope signal of the alternating voltage signal furnished by the ultrasonic transducer 50 is formed.

Figure 12A:
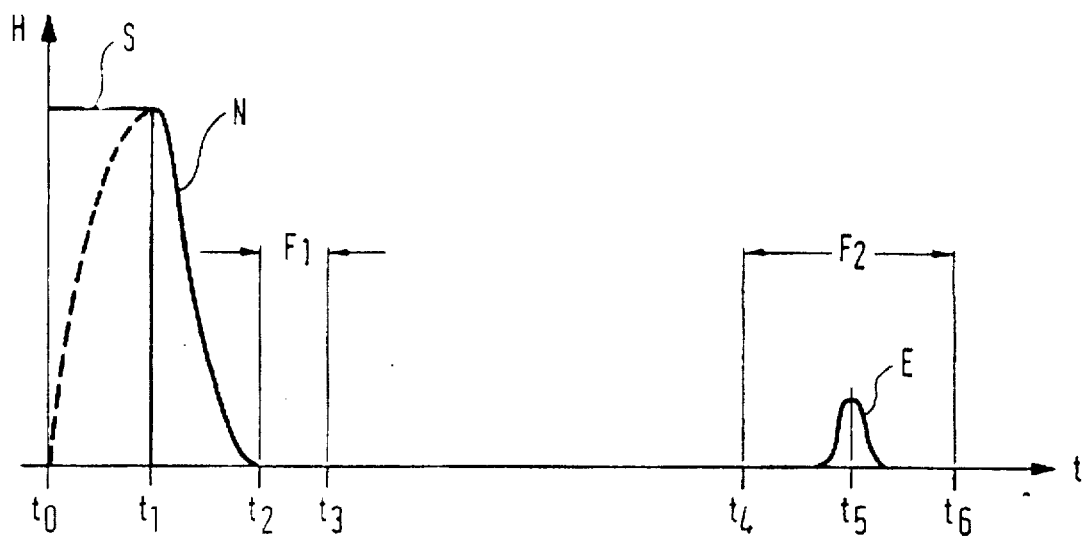
Figure 12B:
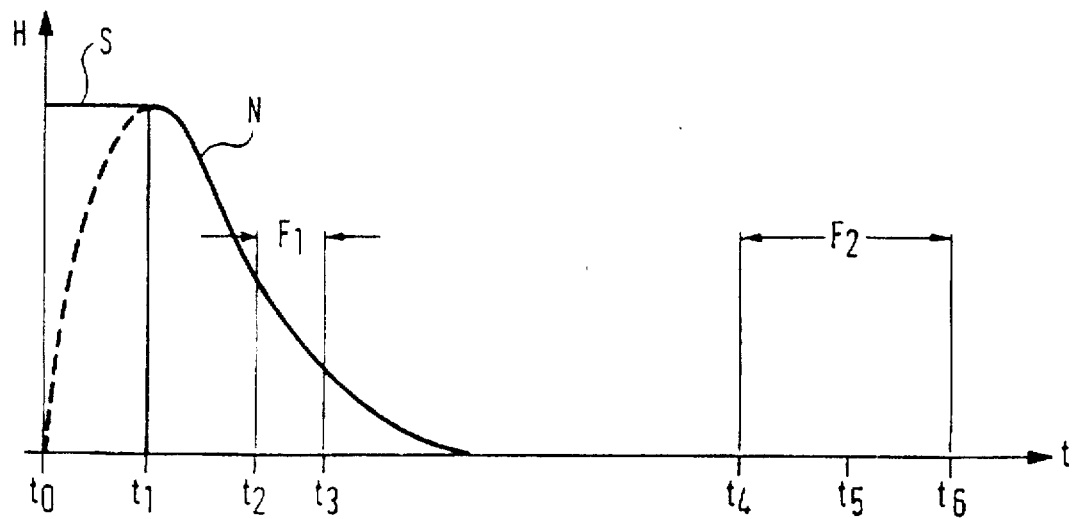

One substantial feature of the excitation and evaluation circuitry of FIG. 11 consists of the transmission frequency generated by the frequency synthesizer circuit for excitation of the ultrasonic transducer 50 being precisely equal to the thickness resonant frequency of the container wall 12 at which the ultrasonic sensor 13 is fitted. This thickness resonant frequency may be the fundamental frequency of the thickness resonance or, in the case of thick container walls, in which this fundamental frequency would be too low, the second order of resonance. The plots of FIGS. 12(a) and 12(b) show the envelope signal received at the output of the envelope generator 110 under this assumption. The plot A of FIG. 12(a) shows the envelope signal H as a function of time t for the case that the level in the container 10 lies above the level to be monitored by the ultrasonic sensor, so that the measurement point, i.e. the point on the container wall 12 at which the ultrasonic sensor is fitted, is covered by the liquid 11. This corresponds to the status of the sensor 15 in FIG. 1. Plot B of FIG. 12(b) shows the envelope signal H as a function of the time t for the case that the level in the container 10 lies below the level to be monitored by the ultrasonic sensor, so that the measurement point is not covered by the liquid 11. This corresponds to the status of the sensor 15 in FIG. 1.

In plot A the transmission pulse S is illustrated which begins at time $t_0$ and ends at time $t_1$. Due to the transmission pulse, excitation of the container wall 12 occurs at the point at which the ultrasonic transducer 50 transfers ultrasonic vibrations to produce thickness vibrations at the natural resonant frequency which gradually build up as illustrated by the dashed line. The transmission pulse is required to be so long that the thickness vibrations achieve the stationary condition prior to the end of the transmission pulse. The thickness vibrations do not cease instantly at the end of the transmission pulse at time $t_1$, they instead dying off gradually due to the after-vibration of the container wall. The envelope signal H thus contains subsequent to the end of the transmission pulse S the envelope N of the after-vibration of the container wall 12. Since, however, the container wall 12 at the point of vibration is dampened by the liquid by which it is covered, the dying off occurs relatively quickly so that at the time $t_2$, which is located relatively shortly behind the time $t_1$, it is substantially terminated and after this time $t_2$ practically no further envelope signal caused by the after-vibration exists.

The container wall vibrating at the thickness resonance also radiates ultrasonic waves into the interior of the container. Since the vibrating measurement point is covered by the liquid, the ultrasonic waves are propagated in the liquid so that they attain the opposite container wall where they are reflected. The reflected ultrasonic waves arrive as an echo signal at the point at which the ultrasonic sensor is fitted, and they are transferred via the container wall to the ultrasonic transducer 50 which converts them into an electrical signal which is applied to the input of the envelope generator 110. This is why the envelope E of the echo signal reflected at the opposite container wall appears in t he envelope signal output by the envelope generator 110 at time $t_5$. Experience has shown that this echo signal is obtained as an optimum when the transmission frequency corresponds to the thickness resonant frequency of the container wall.

The plot B of FIG. 12(b) also shows the transmission pulse S which begins at time $t_0$ and ends at time $t_1$, as well as the envelope N of the after-vibration of the container wall 12. Since the vibrating measurement point of the container wall 12 is not covered by the liquid it is dampened less strongly than in the case of plot A, so that the thickness resonant vibrations of the container wall die out slower. The envelope N of the after-vibration thus has still a considerable height at time $t_2$ at which it has practically disappeared when the measurement point is covered.

In contrast, no echo signal E exists in the envelope signal H of the plot B at the time $t_5$, this being due primarily to the fact that the emission of ultrasonic waves in air is very slight due to the large difference in the acoustical impedances of the container wall and of air. Should nevertheless a weak echo be detected, it would occur substantially later than at time $t_5$ due to the great difference of the speed of sound in liquids and in air.

The phenomena explained on the basis of the plots A and B are evaluated in the excitation and evaluation circuitry of FIG. 11 to determine whether the measurement point of the container wall 12 is covered by liquid or not.

For this purpose the envelope signal H furnished by the envelope generator 110 is applied in parallel to an integrator 120 and a peak detector 122. The integrator 120 is controlled by a control signal furnished by the control circuit 100 so that it, following each emittance of a transmission pulse S, integrates-the envelope signal H in a time window $F_1$ between the times $t_2$ and $t_3$. The peak detector 122 is controlled by a control signal furnished by the control circuit 100 so that it establishes the peak value of the envelope signal H in a time window $F_2$ between the times $t_4$ and $t_6$ which contains the time $t_5$ of the echo signal E.

Integration of the envelope signal H in the time window $F_1$ enhances the reliability in determining whether an after-vibration exists after the time $t_2$ or not, as compared to a simple sensing of the envelope signal at a time which lies behind the time $t_2$. It will be appreciated from comparing the plots A and B of FIGS. 12(a) and 12(b) that the integral of the envelope signal H in the time window $F_1$ in the case of plot B is quite considerably larger than in the case of plot A, even if in the last case sporadic disturbances were to occur in the time window $F_1$. The integrator 120 provides at the output an analog signal I which indicates the value of the integral.

The time window $F_2$ is necessary because the time $t_5$ of the echo signal E may vary due to differing speeds of sound in the liquid. Changes in the speed of sound may result in the same liquid due to changes in temperature. In addition, differing speeds of sound may exist when other liquids are filled into the container. The time window $F_2$ is selected so that under all existing conditions the echo signal lies in this time window. The peak detector 122 provides at the output an analog signal P which indicates the peak of the envelope signal H established in the time window $F_2$.

The output of the integrator 120 is connected to the input of an analog-to-digital converter 128 via a switch 124. The output of the peak detector 122 is also connected to the input of the analog-to-digital converter 128 via a switch 126. The two switches 126 and 128 can be opened and closed by control signals furnished by the control circuit 100. The output of the analog-to-digital converter 128 is connected to a microprocessor 130.

In the microprocessor 130 the digitized output signals of the integrator 120 and the peak detector 122 are evaluated according to the following criteria:

signal I is greater than an assigned threshold value: measurement point not covered;

signal I is smaller than the assigned threshold value: measurement point is covered;

signal P is greater than an assigned threshold value: measurement point is covered;

signal P is smaller than the assigned threshold value: measurement point not covered.

Accordingly, for each of the two states "uncovered" and "covered" a positive signal value ("signal present") and a negative signal value ("signal missing") exist:

in the "uncovered" status signal I is present, while signal P is missing;

in the "covered" status signal P is present, while signal I is missing.

Monitoring the level is thus achieved with high error detection reliability. As long as only one of the two signals I and P exceeds the assigned threshold value in each case, it is assured that the monitored level is correctly determined. When none of the two signals I and P exceeds the assigned threshold value, or if both signals I and P exceed the assigned threshold value at the same time, it is evident that an error exists.

The microprocessor 130 furnishes the result of the signal evaluation to the control circuit 100 which accordingly outputs a signal at an output 100a which indicates whether the level in the container lies above or below the level to be monitored, or whether an error status exists.

As indicated above, the transmission frequency generated by the frequency synthesizer circuit 102 needs to correspond as accurately as possible to the thickness resonant frequency of the container wall 12. This thickness resonant frequency depends on the material and the thickness of the container wall. For containers of metal or glass having a wall thickness between 2 mm and 15 mm the evaluated thickness resonant frequency is in the range of about 0.6 MHz to 2 MHz, for plastics containers having the same wall thickness the range is 0.3 MHz to 0.6 MHz. Furthermore, the thickness resonant frequency for a covered measurement point is somewhat different to the thickness resonant frequency for an uncovered measurement point. In conclusion, the thickness resonant frequency changes in operation particularly as a function of the temperature.

For these reasons the thickness resonant frequency of the container wall is established with the measurement point covered and uncovered and memorized in the control circuit 100 prior to putting the measurement device into operation. These resonant frequencies correspond to the maximum peak value signal P in the covered condition or the maximum integral signal I in the uncovered condition. In addition, the thickness resonant frequencies are corrected in operation at certain time intervals in a specific range about the frequencies found in setting up the measurement device.

The criterion for correcting the frequency used for the integral measurement is a maximum integral signal I, the criterion for correcting the frequency used for the peak value measurement is a maximum peak value signal P. When the frequency values established in this way deviate by more than a certain tolerance threshold from the memorized frequency values the memorized frequency values are correspondingly corrected.

For taking into account the differing thickness resonant frequencies for a covered and an uncovered measurement point the measurement is made preferably in consecutive transmission periods alternatingly with the one or the other memorized thickness resonant frequency.

In a transmission period the control circuit 100 prompts excitation of the ultrasonic transducer 50 at the transmission frequency corresponding to the resonant frequency with the maximum integral signal I. At the same time the control circuit 100 opens the switch 126 so that an output signal P of the peak detector 122 in this transmission period is not evaluated. If the measurement point is in reality not covered, the peak detector 122 would in any case furnish no useful output signal in this transmission period, whereas if the measurement point is covered the output signal of the peak detector 122 would not be an optimum. If, on the other hand, the transmission frequency has the value at which the integrator 120 furnishes the optimum output signal, then the measurement point is in reality not covered.

In the next transmission period the control circuit 100 prompts excitation of the ultrasonic transducer 50 at the transmission frequency corresponding to the resonant frequency with the maximum peak value signal P, and it opens the switch 124 while switch 126 is closed. Accordingly, in this transmission period the output signal I of the integrator 120 is not evaluated. If the measurement point is in reality covered, the integrator 120 would in any case furnish no useful output signal in this transmission period, whereas if the measurement point is not covered the output signal of the integrator 120 would not be an optimum, because it was not made at the correct thickness resonant frequency. If, on the other hand, the transmission frequency has the value at which the peak detector 122 furnishes the optimum output signal, then the measurement point is in reality covered.

These two transmission periods are repeated alternately, this achieving that the microprocessor 130 receives output signals from the integrator 120 in the uncovered condition and from the peak detector 122 in the covered condition which are usable in each case (i.e. exceeding the assigned threshold value) as obtained at the correct thickness resonant frequency.

In this operating mode with alternating transmission frequencies too, the error detection reliability as explained above remains assured, i.e. an error being present when in the two consecutive transmission periods the two signals I and P do not exceed their assigned threshold values or the two signals I and P exceed their assigned threshold values.

If, due to an indicated error status, it is established that either obtaining the after-vibration signal by the integrator 120 or obtaining the echo signal by the peak detector 122 is missing or defective, monitoring the level can be continued with the aid of the other signal in each case, by the switch 224 and 226 assigned respectively to the faulty signal remaining continually open. Although the enhanced error detection reliability as described above is then missing, the measurement device still operates with the same error detection reliability as for known measurement assemblies. The same procedure may be used if sensing one of the two signals for a specific material is not possible. Thus, the measurement device is highly versatile in use without necessitating changes in design.

Since in the device as described above the ultrasonic transducer 50 is excited at a thickness resonant frequency of the container wall 12, the piezoelectric element 51 must be configured so that it operates satisfactorily at the thickness resonant frequency used in each case. Disk-shaped piezoelectric elements exhibit two vibration modes, namely thickness vibrations and radial vibrations having differing resonant frequencies. The radial vibrations are not suitable for the described application, however, because they cannot be practically transferred via the plastics diaphragm 53 and the soft coupling layer so that the energy of radial vibrations is to be viewed as a loss. In the case of conventional solid ceramic piezoelectric elements, for example of lead-zirconate titanate (PZT) the radial vibrations are very pronounced and can only be separated from the thickness vibrations with difficulty. Accordingly, the radial vibrations prove to be a disturbance particularly in the after-vibration range. In particular, however, the useful frequency ranges of conventional piezoelectric elements occupy a very narrow band, whereas in the device as described above the piezoelectric elements, depending on the wall thickness and the material of the container, need to be operated at frequencies in the range of 0.3 MHz to 2 MHz. When employing conventional piezoelectric elements this would mean that practically for each container a precisely adapted piezoelectric element would need to be provided. This would obviously be highly unfavorable both for reasons of production and stocking and as regards an efficient mounting of the level monitoring device.

To get round these difficulties, use is thus made of a piezoelectric element 51 which consists of a porous piezoelectric ceramic having a type 3-3 connectivity.

The term "connectivity" was introduced by R. E. Newnham to characterize the structures of multi-phase solids and also applied to composite electroceramics (R. E. Newnham "Composite Electroceramics, Ferroelectrics 1986, Vol. 68, pages 1–32). The connectivity designates the spatial directions in a three-dimensional right-angled system of coordinates in which the components of each phase are fully connected to each other, 0 meaning that the components of each phase are fully connected to each other in no spatial direction, 1 that the components of each phase are fully connected to each other in only one spatial direction, and so on. Thus "3-3 connectivity" means that in the case of a two-phase solid the components of each of the two phases are fully connected to each other in all three spatial directions.

In the paper "Dielectric, elastic and piezoelectric properties of porous PZT ceramics" by W. Wersing, K. Lubitz and J. Mohaupt in Ferroelectrics 1986, Vol. 68, pages 77–97 the term connectivity is also applied to porous ceramics which are viewed as being two-phase solids in which the one phase is formed by the ceramic material and the other phase by the pores. Thus, in the case of a porous ceramic having a type 3-3 connectivity both the ceramic and the pores are fully connected to each other in all three spatial directions.

Using a porous piezoelectric element 51 having the type 3-3 connectivity eliminates more or less all of the aforementioned problems. For one thing the radial vibration modes are more strongly dampened than with conventional piezoelectric elements, the piezoelectric element behaving almost like a pure thickness resonator. For another, the acoustical impedance is closer to that of the plastics diaphragm 53 and the coupling layer inserted between the diaphragm 53 and the container wall 12 as a result of which a better matching is achieved. Most of all, however, the piezoelectric element is considerably wider in band than a conventional piezoelectric element, thus making it possible to cover the complete frequency range from 0.3 MHz to 2 MHz with three to four piezoelectric elements.

However, the porosity of the piezoelectric element 51 necessitates a few special precautions, especially as regards the potting compound 55 with which the space on the side of the piezoelectric element 51 facing away from the diaphragm 53 is filled. In the case of conventional piezoelectric elements the encapsulation serves, on the one hand, to prevent cavities forming and to encapsulate the electrical and electronic components for reasons of explosion protection, and, on the other, to provide acoustics attenuation on the side of the piezoelectric element facing away from the diaphragm 53. For the porous ceramic piezoelectric elements employed according to the invention encapsulation for acoustical reasons would not be necessary; however, the requirement remains to provide encapsulation for reasons of explosion protection. This requirement necessitates a potting compound which will easily flow on being filled so that even small cavities and gaps are filled out; preferably a fluid silicone potting compound of the type Sylgard 170 is used. There is, however, the contrary requirement that the potting compound must not penetrate into the pores of the piezoelectric element and alter the properties of the latter to disadvantage. Moreover, an acoustical insulation of the potting compound from the piezoelectric element is necessary to prohibit undesirable resonances and a prolonged after-vibration. This requirement necessitates a spatial separation of potting compound and piezoelectric element, here again care must be taken, however, that no cavities materialize in which an explosive gas may accumulate.

These requirements which contradict each other in part are satisfied in the example embodiment as described above by the following measures:

inserting the disk 56 of closed-pore foamed material between the piezoelectric element 51 and the potting compound 55;

preassembling the piezoelectric element 51 and the foamed material disk 56 in the mounting sleeve 60 outside of the transducer housing 52.

The disk 56 for separating the piezoelectric-element 51 from the potting compound 55 preferably consists of a closed-pore foamed silicone material, this being temperature-resistant and preventing a penetration of the potting compound during the hardening phase. Due to preassembly in the mounting sleeve 60 it is assured that the foamed material disk 56 is maintained, even after insertion of the mounting sleeve 60 in the transducer housing 52, in sealing contact with the piezoelectric element 51 by the paws 65 so that creepage of the potting compound between the foamed material disk and the piezoelectric element is prevented.

Due to the high impedance jumps, on the one hand, between the piezoelectric element 51 and the foamed material disk 56 and, on the other, between the foamed material disk 56 and the potting compound 55, the closed-pore foamed silicone material transfers no ultrasound, as a result of which the required acoustical insulation is achieved. Moreover, the pliant foamed silicone material adapts to the solder joint at the adjoining electrode of the piezoelectric element 51 and it surrounds the connecting leads.

We claim:

1. A device for monitoring a predetermined level of a liquid in a container comprising an ultrasonic transducer fitted on the outer surface of the container wall at a measurement point situated at the height of the level to be monitored and which, when excited by an alternating voltage pulse having a given transmission frequency, transfers an ultrasonic transmission pulse to the container wall and converts ultrasonic vibrations, generated by reflected echo pulses, into electrical reception signals that are transferred to an evaluation circuit which depending on whether echo signals appear or not, determines whether the measurement point is covered by the liquid or not, wherein the ultrasonic transducer is excited by a transmission frequency which equals the thickness resonant frequency of the container wall and in the evaluation circuit also the ultrasonic vibrations generated by the after-vibration of the container wall after the end of the transmission pulse are detected in order to establish whether the measurement point is covered by the liquid or not.

2. The device as set forth in claim 1, wherein in said evaluation circuit an envelope signal is formed which corresponds to the envelope of the electrical reception signals output by the ultrasonic transducer, and wherein in a first time window which lies in the range of the after-vibration of the container wall at a position at which the after-vibrations have substantially died away when the measurement point is covered and which are still to die away when the measurement point is uncovered, said envelope signal is sensed and compared to an assigned first threshold value, and in a second time window, in which a reflected echo pulse is to be anticipated, the peak value of the envelope is established and compared to an assigned second threshold value.

3. The device as set forth in claim 2, wherein said envelope signal is integrated in said first time window and the value of the integral is compared to the assigned threshold value.

4. The device as set forth in claim 1, wherein said ultrasonic transducer is excited alternatingly at two different transmission frequencies, of which the first transmission frequency equals the thickness resonant frequency of the container wall when the measuring point is uncovered and the second transmission frequency equals the thickness resonant frequency of the container wall when the measuring point is covered.

5. The device as set forth in claim 4, wherein on excitation of the ultrasonic transducer at said first transmission frequency only the received signals originating from the after-vibration are evaluated and on excitation of the ultrasonic transducer at said second transmission frequency only the received signals originating from the echo pulses are evaluated.

6. The device as set forth in claim 4, wherein said thickness resonant frequencies of said container wall are established with the measurement point uncovered and covered and are stored in said evaluation circuit.

7. The device as set forth in claim 6, wherein in operation in certain time intervals the transmission frequency corresponding to the maximum of the peak value or the transmission frequency corresponding to the maximum of the integral is established in a certain range about the correspondingly stored thickness resonant frequency and that when a deviation is sensed the stored frequency value is corrected.

8. The device as set forth in claim 1, wherein said ultrasonic transducer contains a piezoelectric element which consists of a porous piezoelectric ceramic having a type 3-3 connectivity.

9. The device as set forth in claim 8, wherein said porous piezoelectric ceramic is lead-zirconate titanate (PZT).

10. The device as set forth in claim 8, wherein said piezoelectric element rests on the bottom of a plastics pot-shaped transducer housing serving as a diaphragm, the interior of the transducer housing being filled at least partly by a potting compound, and between the surface of said piezoelectric element facing away from said diaphragm and the potting compound a disk of a closed-pore foamed silicone material being inserted which prevents the potting compound from coming into contact with said piezoelectric element.

11. The device as set forth in claim 10, comprising a mounting sleeve in which said piezoelectric element together with said foamed material disk is installed outside of said transducer housing and which is configured so that after insertion in said transducer housing and prior to filling the potting compound it maintains said foamed material disk in sealing contact with the surface of said piezoelectric element facing away from said diaphragm.

12. The device as set forth in claim 10, wherein between the surfaces of said diaphragm and said piezoelectric element facing each other a hot-curable adhesive is introduced which following insertion of said mounting sleeve in said transducer housing is hardened by being heated.

* * * * *